United States Patent
Albouyeh et al.

(10) Patent No.: US 9,092,121 B2
(45) Date of Patent: Jul. 28, 2015

(54) COPY AND PASTE EXPERIENCE

(71) Applicant: International Business Machines Corporation, Armonk, NY (US)

(72) Inventors: Shadi Eskamaei Albouyeh, Raleigh, NC (US); Bernadette Alexia Carter, Raleigh, NC (US); Jon Mark Harris, Raleigh, NC (US); Tintin Sukawati Soemargono, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 316 days.

(21) Appl. No.: 13/691,534

(22) Filed: Nov. 30, 2012

(65) Prior Publication Data

US 2014/0157168 A1 Jun. 5, 2014

(51) Int. Cl.
*G06F 3/14* (2006.01)
*G06F 3/0484* (2013.01)
*G06F 9/44* (2006.01)
*G06F 9/54* (2006.01)

(52) U.S. Cl.
CPC .............. *G06F 3/0484* (2013.01); *G06F 9/4443* (2013.01); *G06F 9/543* (2013.01)

(58) Field of Classification Search
CPC ..................................... G06F 3/14; G06F 3/17
USPC .......... 715/200–277, 700–867; 709/201–229; 705/50–79; 345/30–111; 718/100
See application file for complete search history.

(56) References Cited

U.S. PATENT DOCUMENTS

| | | | |
|---|---|---|---|
| 7,689,933 B1* | 3/2010 | Parsons | 715/838 |
| 8,892,679 B1* | 11/2014 | Destagnol et al. | 709/213 |
| 8,949,729 B2 | 2/2015 | Bastide et al. | |
| 2008/0072225 A1* | 3/2008 | Nagatsuka et al. | 718/100 |
| 2008/0282179 A1* | 11/2008 | Kim et al. | 715/769 |
| 2013/0212539 A1* | 8/2013 | Hebbar et al. | 715/854 |

OTHER PUBLICATIONS

Olivier Chapuis, Copy-and-Paste between Overlapping Windows, Proceedings of the SIGCHI Conference on Human Factors in Computing Systems 2007, CHI 2007, Association for Computing Machinery.
Dale Fletcher, Facilitating Multiple Copy/Paste Operations, Proceedings First Australasian User Interface Conference., IEEE.
U.S. Appl. No. 13/495,755, filed on 6/13/201.

* cited by examiner

*Primary Examiner* — Ruay Ho
(74) *Attorney, Agent, or Firm* — Convergent Law Group LLP

(57) ABSTRACT

An improved copy and paste experience includes capturing information about open applications including a screenshot of each of the open applications shown in a viewable area of the open applications; in response to receiving a copy command while the user is interacting with a first application, presenting the screenshots of the other open applications to the user for selection; in response to the user selecting one of the screenshots corresponding to a second application, displaying visual content segments from the second application; in response to receiving a user selection of two or more of the visual content segments, copying the selected visual content segments; and inserting the selected visual content segments into the first application such that original spatial relations between the visual content segments from the second application are maintained when the visual content segments are inserted into the first application.

17 Claims, 6 Drawing Sheets

COPY AND PASTE EXPERIENCE

BACKGROUND

In computer parlance, the phrases "copy and paste" typically refer to commands that enable a user to transfer material, such as text, data, files or objects from a source, such as a page of a document, to a destination, such as another page of the document.

When copying and pasting, the user first selects the material, and then activates the copy command to create a duplicate instance of the material. The copied material is then temporally saved in a "clipboard." The user places a cursor in a different position and then activates the "paste" command to transfer the material from the clipboard to the position where the paste command is issued. This operation is typically used with a graphical user interface that uses pointing devices such as a computer mouse, or by a drag-and-drop interaction, for example.

The copy and paste commands may also be used to transfer material from one application to another application, where each application is typically displayed in a separate window. However, copying and pasting between applications can be cumbersome for the user. There typically are three-time-wasting challenges uses encounter when copying and pasting across two or more applications. One challenge is that the user typically needs to resize the active application window to make room on the screen for the display of other windows. This means that the user may need to frequently scroll within the resized active window because the smaller size is not optimal for the content. Further this kind of window management is not ideal and takes time.

The second challenge is that the user typically will minimize a number of unrelated windows (i.e., convert the windows to the size of an icon along an edge of the screen) so that there are fewer windows obscuring and blocking the source and target windows. Even with all unrelated windows minimized, switching back and forth between the source and target windows may still present a challenge to the user, and if all the unrelated windows are not minimized, the desired source and target windows may be obscured by the other windows, leaving only small and nondescript sections of the desired windows visible.

Another challenge for the user is that when switching between windows, the cursor focus or insertion point in the window (the location in the document where the user is working) is typically lost. This is a result of clicking on a window obscured by the others to bring the desired window into focus and into the foreground. The user must repeatedly find the proper insertion point within each window because the insertion point is lost when clicking on the window to bring into focus. A multi-item clipboard is one known approach, but requires the user to still encounter window management problems when copying and pasting among multiple windows.

Accordingly, a need exists for a method and system that provides an improved a copy and paste experience.

BRIEF SUMMARY

Exemplary embodiments disclose a method and system for improved copy and paste experience. Aspects of the exemplary embodiment include automatically detecting a predetermined number of copy and paste commands from a first window to a target window; in response to detecting the predetermined number of copy and paste commands, miniaturizing a portion of content from the first window and dynamically positioning the miniaturized portion of content adjacent to the target window; and responsive to detecting user interaction with the miniaturized portion of content, temporarily expanding the miniaturized portion of content to allow user access to the portion of content from the first window.

DETAILED DESCRIPTION

The present invention relates to methods and systems for an improved copy and paste experience. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The exemplary embodiments provide methods and systems for an improved copy and paste experience. The system can detect when a user is copying and pasting across multiple windows, i.e., between applications or between documents of the same application. In response, the system reduces the size of the content in the source window for display in a miniaturized source window that is dynamically positioned to a convenient location adjacent to the target window. When the system detects the user interacting with the miniaturized source window, such as by placing a cursor over the window, the system temporarily expands the miniaturized source window to allow easy and quick access to the source content. After the user copies some, or all of the source content, from the expanded window, the expanded window automatically miniaturizes and returns to the position adjacent to the target window for subsequent easy re-access to the source content.

The exemplary embodiments reduce the inconvenience and wasted time of repeatedly copying and pasting content among multiple windows by addressing window management, screen real estate, and other problems encountered by users.

Figure 1:
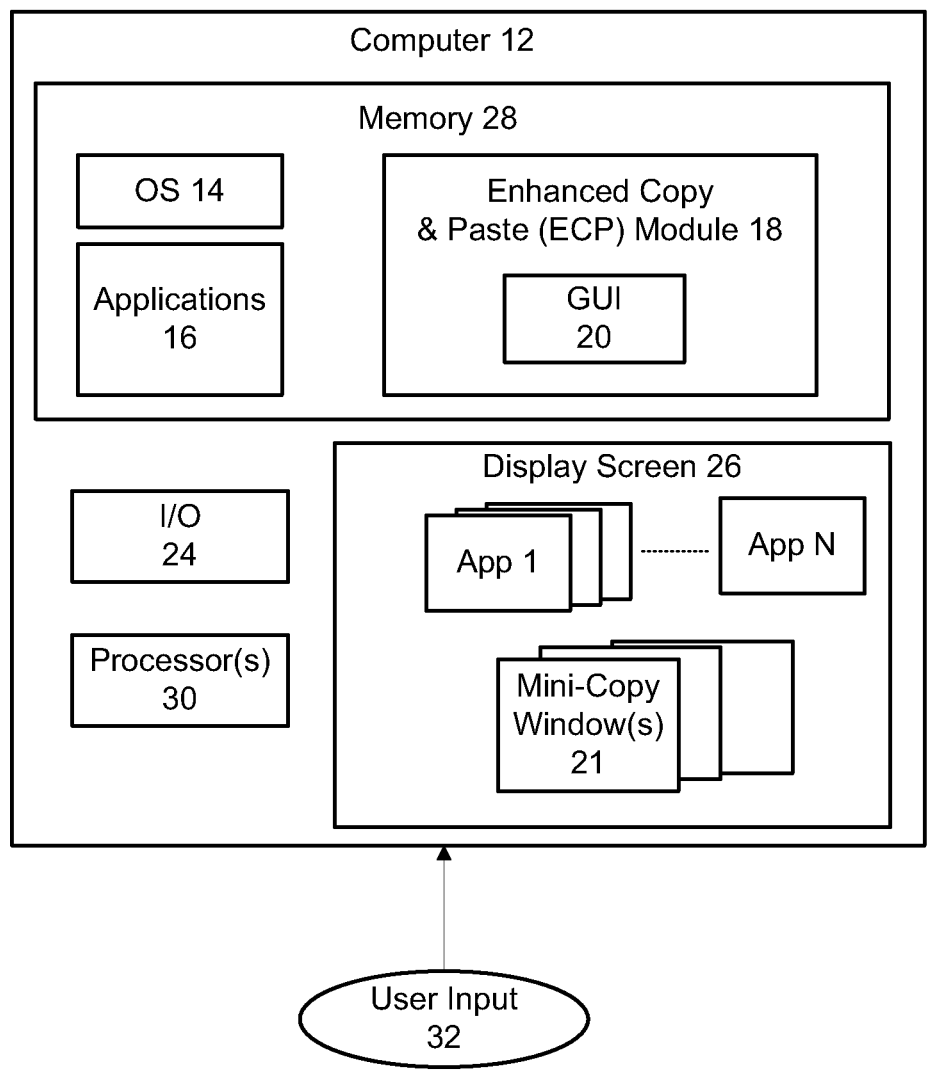
FIG. 1 is a logical block diagram illustrating an exemplary system environment for implementing one embodiment of an improved copy and paste experience.

FIG. 1 is a logical block diagram illustrating an exemplary system environment for implementing one embodiment of an improved copy and paste experience. The system 10 includes a computer 12 having an operating system 14 capable of executing various software applications 16. The software applications 16 may be controlled by a user with pointing devices, such as a mouse or stylus, and/or may be touch screen enabled, which enables the applications to be used with a variety of pointing devices, including the user's finger and various types of styluses.

During operation, opening and running the software applications 16 (App 1 through App N) may display objects such as text, video, images and icons in a window, view, or page on a display screen 26. Example types of applications 16 may include a web browser, a word processor or document editor, a spreadsheet, a presentation application and the like. The application 16 that a user of the computer 12 is currently interacting with is said to be the active application or the application that is in focus. Periodically, a user may wish to copy material from one application to another.

According to an exemplary embodiment, an enhanced copy and paste (ECP) module is provided that enables the user to copy and paste material between applications 16 in a more efficient manner. The ECP module 18 is configured to insert into a first application visual content copied from a second application with minimal need for the user to switch context between the applications 16. In one embodiment, the ECP module 18 may either interact with or bypass traditional "clipboards" that are used to implement conventional cut and paste commands.

In one embodiment, the ECP module 18 may be implemented as a standalone application or as a plug-in for the application 16. In one embodiment, the ECP module 18 is responsive to user input 32 to dynamically rearrange the layout, size, and positioning of content from relevant source applications to provide the user with quick and easy access to move the content from multiple source applications to a target application. In one embodiment, the ECP module 18 dynamically miniaturizes a portion of the content from one or more source applications based on a recent history of user copy and paste commands of the user, and repositions the miniaturized content in a graphical user interface (GUI) 20 adjacent to the target application. Although ECP module 18 is shown as a single component, the functionality provided by the ECP module 18 may be implemented as more than one module or may be incorporated into an application 16 or the operating system 14.

The computer 12 may exist in various forms, including a personal computer (PC), (e.g., desktop, laptop, or notebook), a tablet, a smart phone, a set-top box, a game system, and the like. The computer 12 may include modules of typical computing devices, including input/output (I/O) devices 24. Examples of typical input devices may include keyboard, pointing device, microphone for voice commands, buttons, touch screen, etc., and an example of an output device is a display screen 26. The computer 12 may further include computer-readable medium, e.g., memory 28 and storage devices (e.g., flash memory, hard drive, optical disk drive, magnetic disk drive, and the like) containing computer instructions that implement the application 16 and an embodiment of ECP module 18 when executed by a processor.

A data processing system suitable for storing and/or executing program code includes at least one processor 30 coupled directly or indirectly to when one or more memory elements through a system bus. The memory 28 can include local memory employed during actual execution of the program code, bulk storage, and cache memories, which provide temporary storage of at least some program code in order to reduce the number of times code must be retrieved from bulk storage during execution.

The I/O devices 24 can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

As an alternative embodiment, the system may be implemented as a client/server model, where a website or application offers the improved copy and insert capability as part of a web solution, e.g., a web editor.

Figure 2:
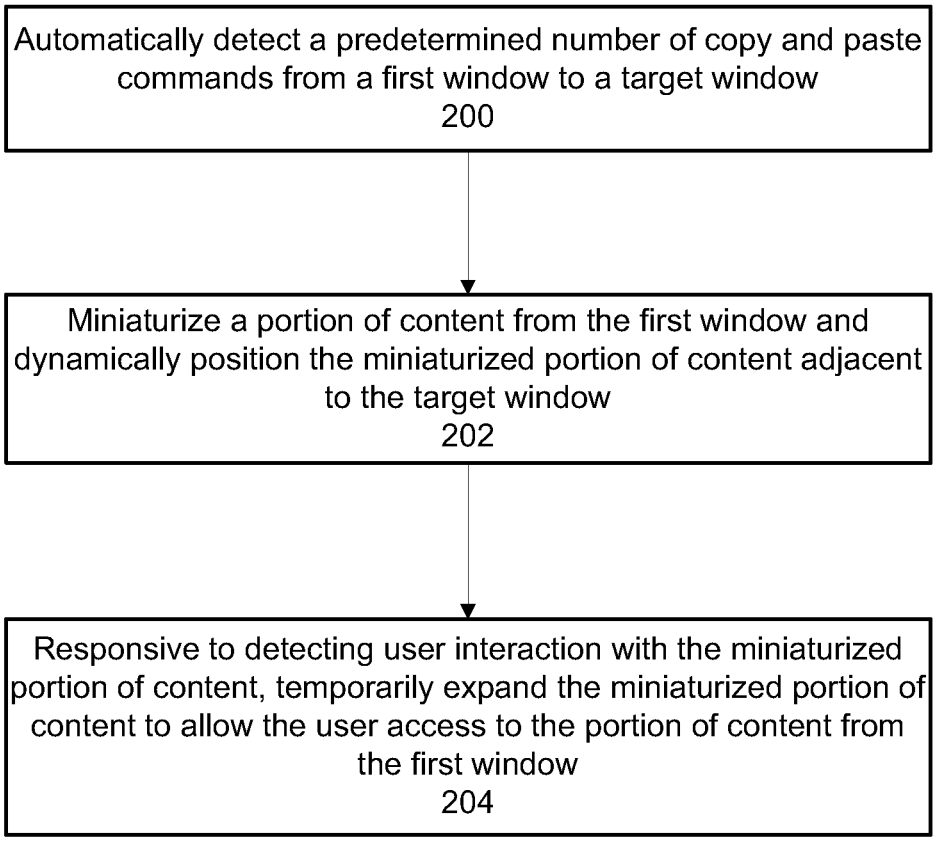
FIG. 2 is a diagram illustrating a process for an improved copy and paste experience according to an exemplary embodiment.

FIG. 2 is a diagram illustrating a process for an improved copy and paste experience according to an exemplary embodiment. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The process may begin by the ECP module 18 automatically detecting a predetermined number of copy and paste commands from a first window to a target window (block 200).

As used herein, the term window means the conventional rectangular-shaped viewing area of an application displayed on the display screen 26 in a graphical user interface (GUI), the boundaries of which can be expanded or contracted by the user. In this embodiment, the user may copy and paste content between windows of different applications, or between windows of the same application. The content displayed in the windows may comprise saved content that is retrieved locally from the user's computer, downloaded from a webpage, or unsaved content such as unsaved new or edited content in an application, an instant message session, or any other form of temporary content.

In one embodiment, the ECP module 18 is configured to automatically detect, at any time, the user's interaction pattern of copying content from one or more source windows to a target window, or groups of source and target windows.

Figure 3:
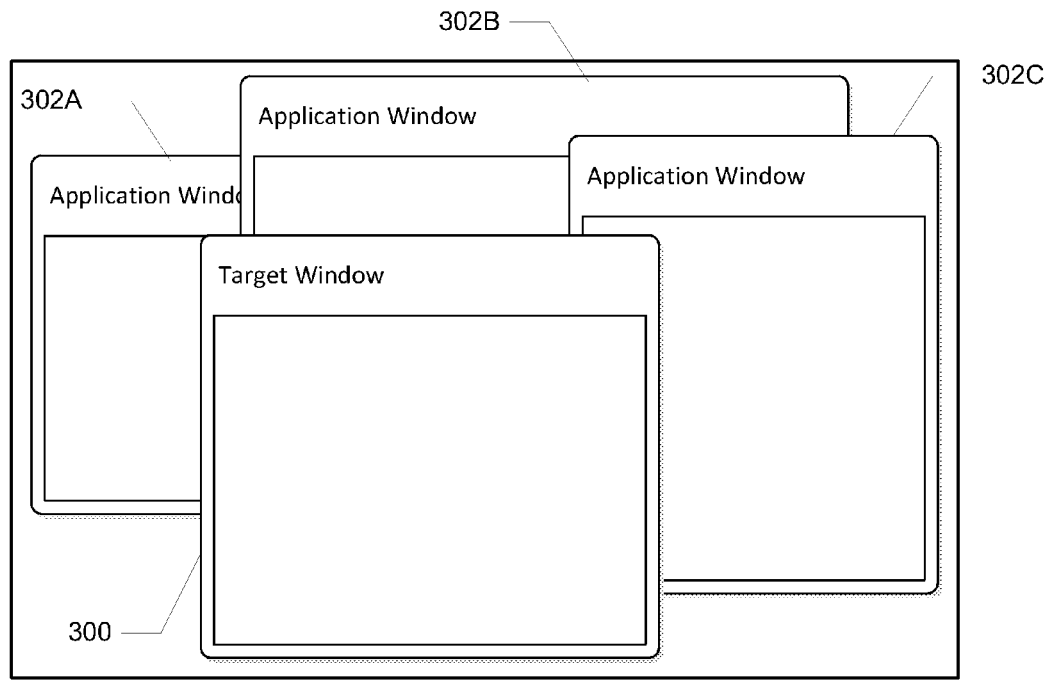
FIG. 3 is a diagram illustrating a desktop of a user computer displaying open application windows.

FIG. 3 is a diagram illustrating a desktop of a user computer displaying open application windows. In the example shown, assume the user is preparing for a trip and is copying relevant information into a document from other applications. The user is interacting with a target window 300, which may represent a document editor, and is the application 16 having primary focus. While the user is putting the document together, the user has many other open application windows 302A, 302B, 302C (collectively referred to as application windows 302), such as a browser window, a spreadsheet a PDF viewer, and the like. To create the document, the user may continually shift between the target window 300 and the other application windows 302 to copy content from the other application windows 302 into the document in the target window 300.

Figure 4:
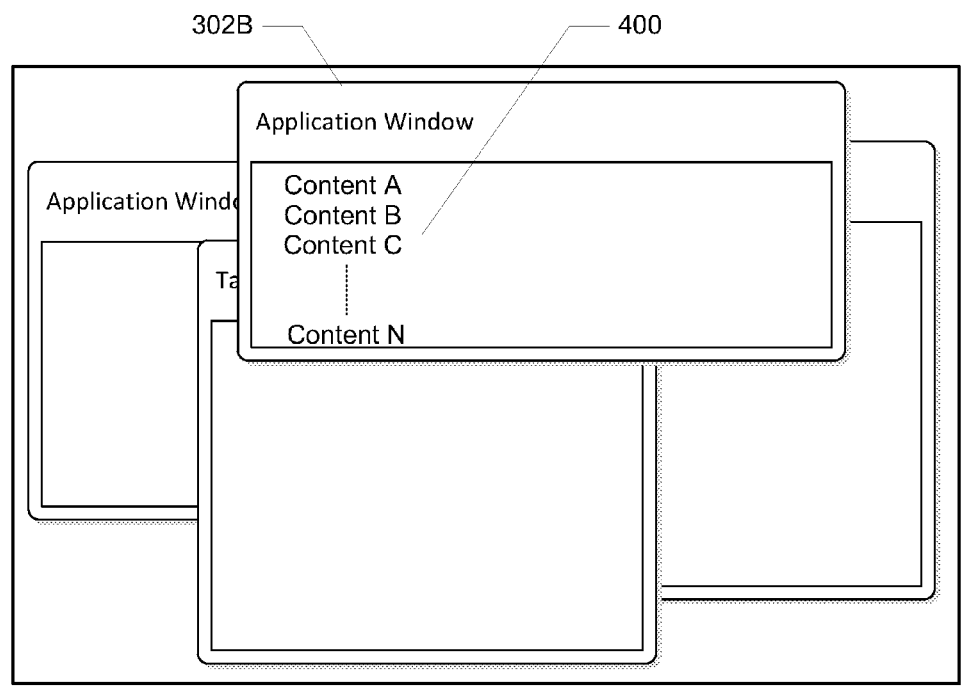
FIG. 4 is a diagram showing the user navigating to an application window.

For example, FIG. 4 is a diagram showing that the user has navigated to the application window 302B, bringing application window 302B into focus. Application window 302B includes portions of content, shown here as Content A, Content B, . . . Content N, which may include any combination of text, tables, spreadsheets, presentations, images, videos, graphics, and the like.

Figure 5:
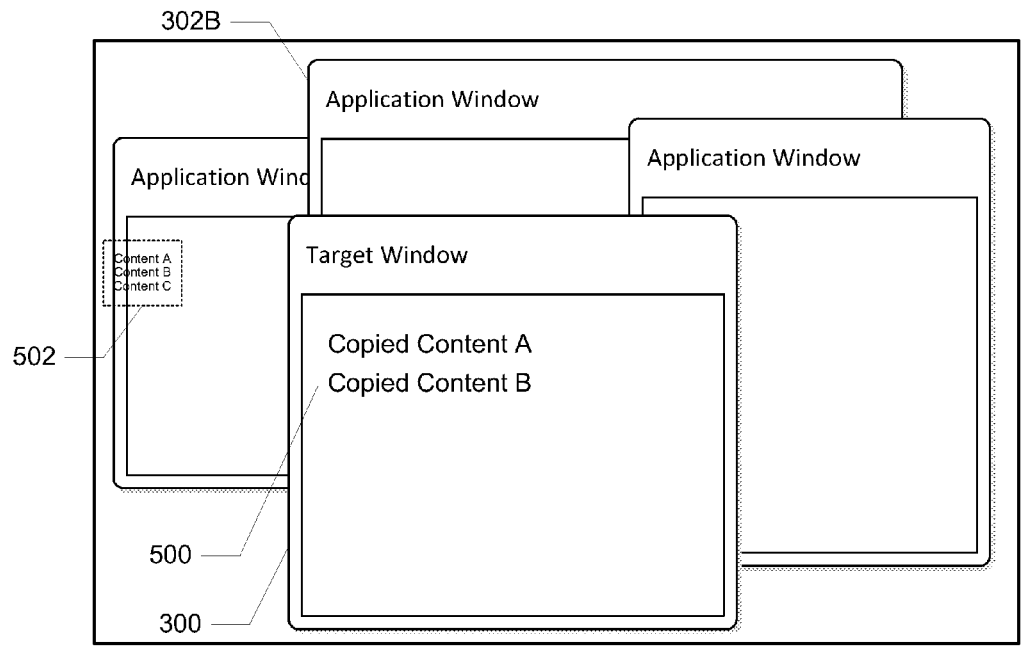
FIG. 5 is a diagram showing the target window after the user has copied two portions of content from the source application window and pasted the content into the target window as pasted content.

FIG. 5 is a diagram showing the target window 300 after the user has copied two portions of content from the source application window 302B and pasted the content into the target window 300 as pasted content 500.

In one embodiment, the ECP module 18 keeps track of the number of times that the user invokes a set of copy and paste commands between each of the open application windows 302 and the target window windows 300. Once the ECP module 18 determines that the number of times the user invokes the set of copy and paste commands form a particular source window to the target window 300 is equal to (and/or greater than) the predetermined number of copy and paste commands, the ECP module 18 may perform the process below. In one embodiment, the predetermined number of copy and paste command sets may be set to at least two.

Referring again to FIG. 2, in response to detecting the predetermined number of copy and paste commands, the ECP module 18 miniaturizes a portion of content from the source application window 302B and dynamically positions the miniaturized portion of content adjacent to the target window (block 202).

Referring again to FIG. 5, the miniaturized portion of content from the source application window 302B is shown displayed adjacent to the target window 300. In one embodiment, the miniaturized portion of content may be displayed in a miniaturized preview window 502 that persistently hovers adjacent to the target window 300 and above any other open windows. In one embodiment, the miniaturized preview window 502 may be displayed as a borderless and semi-transparent window to minimize potential obstruction to underlying windows 302.

In one embodiment, the miniaturized preview window 502 may be displayed adjacent to a border of the target window 300, such as the top left or right side of the target window 300, for example. In another embodiment, the miniaturized preview window 502 may be displayed adjacent to the target window 300 but along an edge of the display screen 26. In yet another embodiment, the miniaturized preview window 502 may be displayed overlapping with the target window 300.

In one embodiment, the ECP module 18 miniaturizes a copy of the content, or portion thereof, from the source application window 302B for display in the miniaturized preview window 502. In another embodiment, the ECP module 18 may miniaturize the source application window 302B entirely and reposition the source application window 302B adjacent to the target window 300.

Referring again to FIG. 2, responsive to detecting user interaction with the miniaturized portion of content, the ECP module 18 temporarily expands the miniaturized portion of content to allow the user access to the portion of content from the first window (block 204).

In one embodiment, detection of the user interaction may comprise detecting the cursor hovering over the miniaturized portion of content displayed in the miniaturized preview window 502 for a predetermined amount of time (e.g., greater than 1-2 seconds). In another embodiment utilizing a touchscreen device, detection of the user action may comprise detecting a press and hold event on the miniaturized portion of content.

Figure 6:
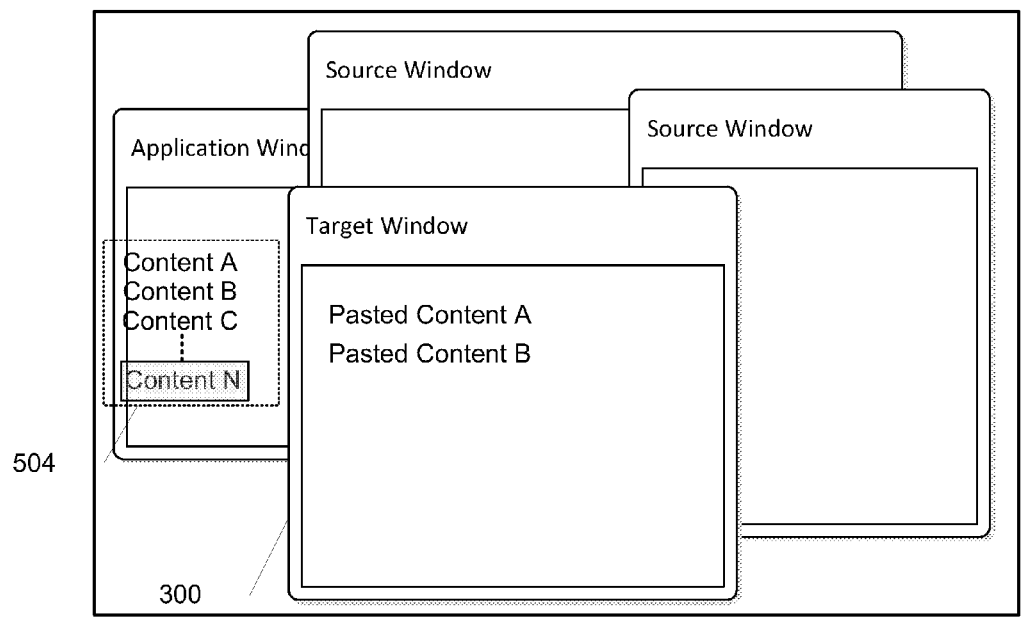
FIG. 6 is a diagram showing the miniaturized preview window enlarged into an expanded preview window.

In one embodiment, the ECP module 18 may expand the miniaturized preview window 502 into an expanded preview window 504 that is moderately sized between that of the miniaturized preview window 502, and the target window 300, as shown in FIG. 6.

FIG. 6 is a diagram showing the miniaturized preview window enlarged into an expanded preview window 504. The expanded preview window 504 allows the user to select a desired region within the miniaturized portion of content for copying to the target window, preferably using a standard "drag-and-drop" or "click and drag" operation. As is well known, drag-and-drop in a GUI is the action of (or support for the action of) clicking and holding the cursor on a displayed object and moving the cursor to drag the object to a different location or onto another object, such as the target window 500. The example shown, the user as selected the highlighted content labeled "Content N" in the expanded preview window 504 for the drag-and-drop operation. Thus, the expanded preview window 504 allows the user to copy selected items of content, such as a character, a word, a sentence, a paragraph, an image, a spreadsheet, a presentation, a table, a chart, a video, or parts thereof, from the source window, thereby providing quick and immediate access to a fine-grained level of content from the source window.

Figure 7:
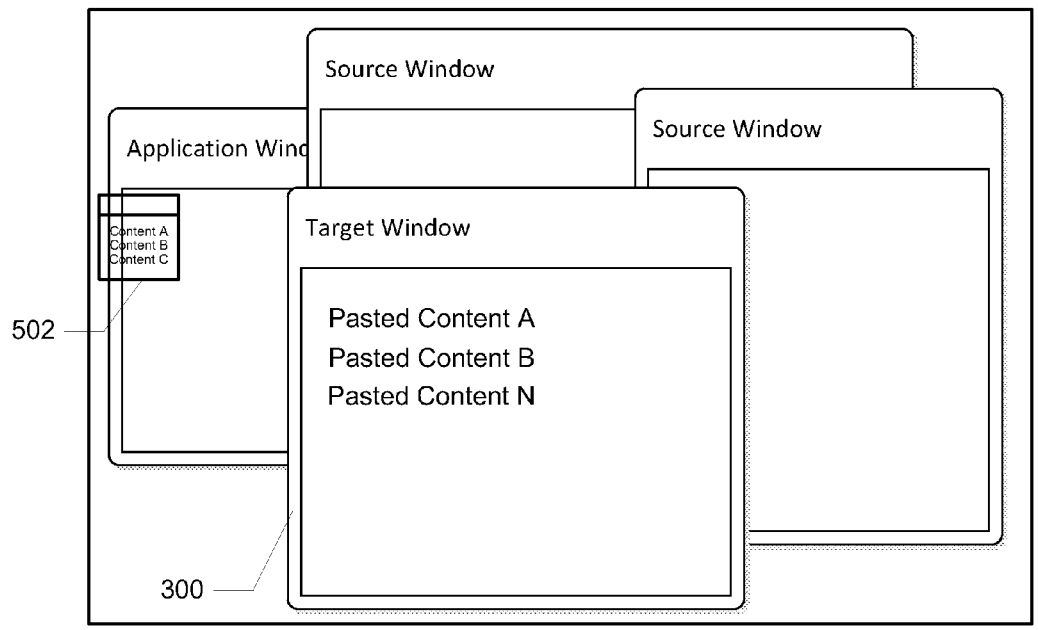
FIG. 7 is a diagram illustrating content of the target window after the drag-and-drop operation.

FIG. 7 is a diagram illustrating content of the target window 300 after the drag-and-drop operation. As soon as the user drags the cursor to the target window 300 and releases the cursor from the drag-and-drop operation, the selected contents are immediately copied and inserted into the target window 300, and the display of expanded preview window 504 is returned to the display of the miniaturized preview window 502, where it remains easily accessible in 3-D space for quick access. At the same time, focus is brought back to the target window 300.

In a further embodiment, the ECP module 18 may be configured to observe and detect the user's interactions with multiple source windows, and create miniaturized portions of content from each of the multiple source windows for display in corresponding preview windows so that the most frequently accessed source content items are most easily accessible.

Figure 8:
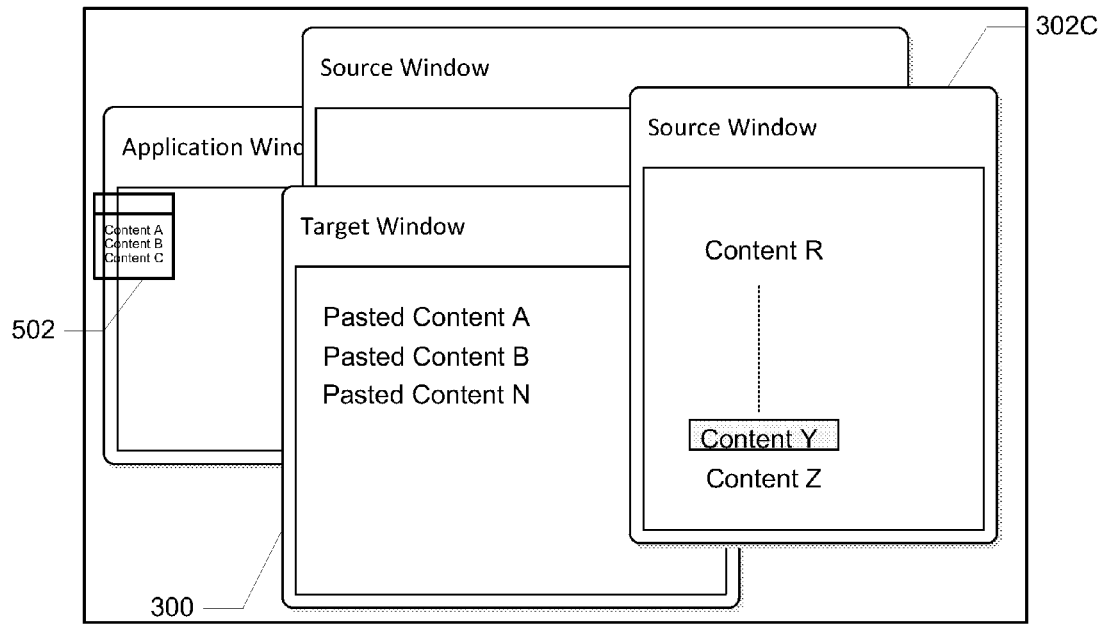
FIG. 8 is a diagram illustrating the switching focus to source window and selecting copying content "Content Y".
Figure 9:
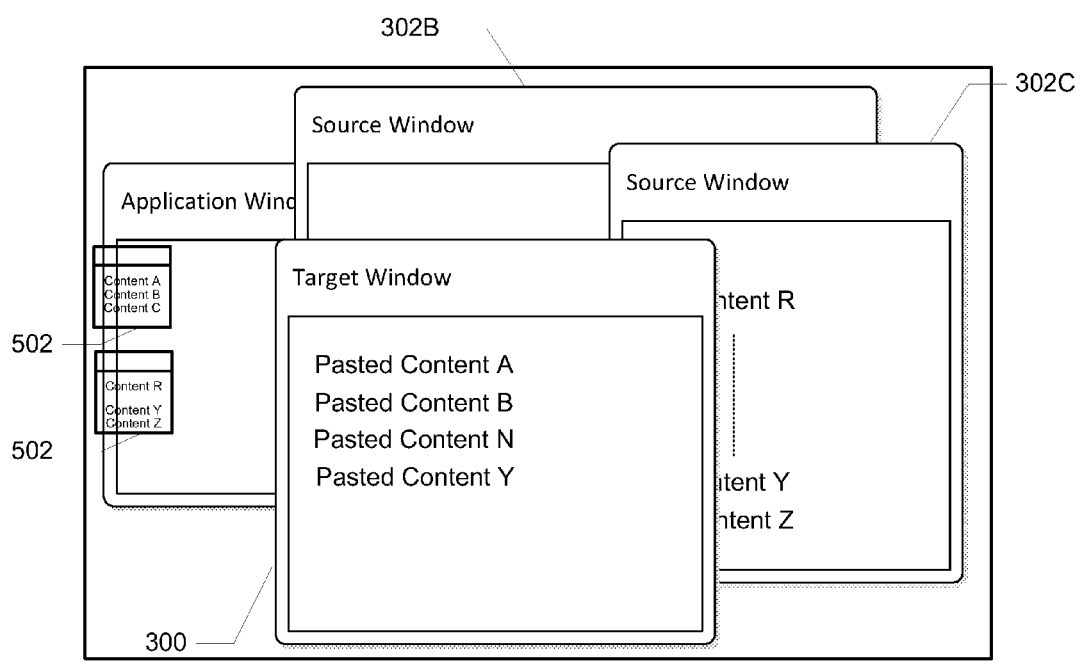
FIG. 9 is a diagram illustrating the display of multiple miniaturized content preview windows.

FIG. 8 is a diagram illustrating the switching focus to source window 302C and selecting copying content "Content Y". Assuming the user has selected content from the source window 302C the predetermined number of times, the ECP module 18 creates a miniaturized preview window 502 for the source window 302C and displays the miniaturized preview window 502 adjacent to the miniaturized preview window 502 corresponding to source window 302B, as shown in FIG. 9.

For example, if the user is moving content about sports across multiple documents, that would create one set of source/target associations, while at the same time the user was also moving content about software development across other documents, it would create a second set of source/target associations. With these "source/target associations" when the user switched to a particular content target, the set of displayed miniaturized preview windows would change as well. In this example, if the target document was the sports content, the sports related miniaturized preview windows would appear. When the target document was switched to the software development content, the miniaturized preview windows related to software development would replace the miniaturized preview windows and related to sports.

When the user is finished moving content across the documents/windows, the user can explicitly close the miniaturized preview windows by clicking on an "X" control that maybe displayed in the top right corner of each of the miniaturized preview windows. Additionally, the ECP module 18 may be configured to cease to display the miniaturized preview windows after a predetermined amount of inactivity. Subsequently, all related miniaturized source items would immediately re-appear when the user copies and pastes among the same set of source and target content.

Accordingly, the ECP module 18 of the exemplary embodiments reorganizes multiple source windows so that a user can repeatedly access and copy content from the source windows during subsequent interactions in a very efficient manner.

A system and method for an improved copy and paste experience has been disclosed. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A computer-implemented method for copying and pasting, the method performed by program instructions executed on a computer having at least one processor, the method comprising:
   automatically detecting a predetermined number of copy and paste commands performed by a user from a source window to a target window, the source window and the target window comprising application windows of at least one of a web browser, a word processor or document editor, a spreadsheet, a presentation application;
   in response to detecting the predetermined number of copy and paste commands, miniaturizing a portion of content from the source window for display in a miniaturized preview window, and dynamically positioning the miniaturized preview window adjacent to the target window, wherein the miniaturized preview window persistently hovers adjacent to the target window and above any other open windows;
   detecting user interaction with the miniaturized portion of content by at least one of: detecting a cursor hovering over the miniaturized portion of content for a predetermined amount of time; and detecting a press and hold event on the miniaturized portion of content; and
   temporarily expanding the miniaturized portion of content to allow user access to the portion of content from the source window by enlarging the miniaturized preview window into an expanded preview window that allows the user to select a desired region within the miniaturized portion of content for copying to the target window using a drag-and-drop operation.

2. The method of claim 1 further comprising: displaying the miniaturized preview window as a borderless and semi-transparent window.

3. The method of claim 1 wherein miniaturizing a portion of content from the source window further comprises at least one of: miniaturizing a copy of the portion of content from the source window for display in the miniaturized preview window; and miniaturizing the source window entirely and repositioning the source window adjacent to the target window.

4. The method of claim 3 further comprising upon completion of the drag-and-drop operation, returning display of the expanded preview window to display of the miniaturized preview window.

5. The method of claim 1 further comprising: detecting a user's interactions with multiple source windows, and created multiple miniaturized portions of content from the multiple source windows for display in corresponding preview windows.

6. The method of claim 1 wherein automatically detecting a predetermined number of copy and paste commands from the source window to the target window further comprises:
 keeping track of a number of times that the user invokes a set of copy and paste commands between the source window and the target window; and
 determining when the number of times that the user invokes the set of copy and paste commands is equal to the predetermined number of copy and paste commands.

7. The method of claim 1 wherein the content in the source window includes any combination of text, tables, spreadsheets, presentations, images, videos, and graphics.

8. An executable software product stored on a non-transitory computer-readable medium containing program instructions for copying and pasting, the program instructions for:
 automatically detecting a predetermined number of copy and paste commands performed by a user from a source window to a target window, the source window and the target window comprising application windows of at least one of a web browser, a word processor or document editor, a spreadsheet, a presentation application;
 in response to detecting the predetermined number of copy and paste commands, miniaturizing a portion of content from the source window for display in a miniaturized preview window, and dynamically positioning the miniaturized preview window adjacent to the target window, wherein the miniaturized preview window persistently hovers adjacent to the target window and above any other open windows;
 detecting user interaction with the miniaturized portion of content by at least one of: detecting a cursor hovering over the miniaturized portion of content for a predetermined amount of time; and detecting a press and hold event on the miniaturized portion of content; and
 temporarily expanding the miniaturized portion of content to allow user access to the portion of content from the source window by enlarging the miniaturized preview window into an expanded preview window that allows the user to select a desired region within the miniaturized portion of content for copying to the target window using a drag-and-drop operation.

9. The executable software product of claim 8 further comprising program instructions for: displaying the miniaturized preview window as a borderless and semi-transparent window.

10. The executable software product of claim 8 wherein miniaturizing a portion of content from the source window further comprises program instructions for at least one of: miniaturizing a copy of the portion of content from the source window for display in the miniaturized preview window; and miniaturizing the source window entirely and repositioning the source window adjacent to the target window.

11. The executable software product of claim 10 further comprising upon completion of the drag-and-drop operation, returning display of the expanded preview window to display of the miniaturized preview window.

12. The executable software product of claim 8 further comprising program instructions for: detecting a user's interactions with multiple source windows, and creating multiple miniaturized portions of content from the multiple source windows for display in corresponding preview windows.

13. The executable software product of claim 8 wherein automatically detecting a predetermined number of copy and paste commands from the window to the target window further comprises program instructions for:
 keeping track of a number of times that the user invokes a set of copy and paste commands between the source window and the target window; and
 determining when the number of times that the user invokes the set of copy and paste commands is equal to the predetermined number of copy and paste commands.

14. The executable software product of claim 8 wherein the content in the source window includes any combination of text, tables, spreadsheets, presentations, images, videos, and graphics.

15. A system for copying and pasting, comprising:
 a computer comprising a memory, processor and a display screen;
 at least two open applications executing on the computer, each of the at least two open applications displaying a window on the display screen; and
 software executing on the computer, the software configured to:
 automatically detect a predetermined number of copy and paste commands performed by a user from a source window to a target window, the source window and the target window comprising application windows of at least one of a web browser, a word processor or document editor, a spreadsheet, a presentation application;
 in response to detection of the predetermined number of copy and paste commands, miniaturize a portion of content from the source window for display in a miniaturized preview window, and dynamically position the preview window adjacent to the target window, wherein the miniaturized preview window persistently hovers adjacent to the target window and above any other open windows; and
 detecting user interaction with the miniaturized portion of content by at least one of: detecting a cursor hovering over the miniaturized portion of content for a predetermined amount of time; and detecting a press and hold event on the miniaturized portion of content; and
 temporarily expand the miniaturized portion of content to allow user access to the portion of content from the source window by enlarging the miniaturized preview window into an expanded preview window that allows the user to select a desired region within the miniaturized portion of content for copying to the target window using a drag-and-drop operation.

16. The system of claim 15 wherein the miniaturized preview window is displayed as a borderless and semi-transparent window.

17. The system of claim 15 wherein the miniaturizing a portion of content from the source window is at least one of: a miniaturized copy of the content from the source window for display in the miniaturized preview window; and a miniaturized source window that is repositioned adjacent to the target window.

* * * * *